(12) United States Patent
Wells et al.

(10) Patent No.: US 7,237,037 B2
(45) Date of Patent: Jun. 26, 2007

(54) COMBINED MESSAGE BROKER

(75) Inventors: David J. Wells, Los Gatos, CA (US);
Bernd Schneider, Sindelfingen (DE);
Annette Neumann-Eberhard,
Boeblingen (DE); Frank Nitsch,
Herrenberg (DE)

(73) Assignee: Hewlett-Packard Development Company, L.P., Houston, TX (US)

( * ) Notice: Subject to any disclaimer, the term of this patent is extended or adjusted under 35 U.S.C. 154(b) by 703 days.

(21) Appl. No.: 09/969,369

(22) Filed: Oct. 1, 2001

(65) Prior Publication Data

US 2003/0065726 A1    Apr. 3, 2003

(51) Int. Cl.
*G06F 13/00*    (2006.01)

(52) U.S. Cl. .................. 709/246; 709/206; 709/250; 719/311

(58) Field of Classification Search ............ 709/206, 709/213, 230, 231, 238, 246, 250; 719/311
See application file for complete search history.

(56) References Cited

U.S. PATENT DOCUMENTS

| | | | | |
|---|---|---|---|---|
| 5,815,665 | A * | 9/1998 | Teper et al. ................ | 709/229 |
| 5,968,110 | A | 10/1999 | Westrope et al. | |
| 6,219,653 | B1 | 4/2001 | O'Neill et al. | |
| 6,349,336 | B1 * | 2/2002 | Sit et al. .................... | 709/227 |
| 6,405,266 | B1 * | 6/2002 | Bass et al. ................. | 719/328 |
| 6,460,020 | B1 | 10/2002 | Pool et al. | |
| 6,510,429 | B1 * | 1/2003 | Todd .......................... | 707/10 |
| 6,567,783 | B1 * | 5/2003 | Notani et al. ............... | 705/9 |
| 6,611,834 | B1 * | 8/2003 | Aggarwal et al. .......... | 707/10 |
| 6,636,855 | B2 * | 10/2003 | Holloway et al. ........... | 707/10 |
| 6,671,728 | B1 * | 12/2003 | Mayberry .................. | 709/227 |
| 6,674,725 | B2 * | 1/2004 | Nabkel et al. ............. | 370/252 |
| 6,772,413 | B2 * | 8/2004 | Kuznetsov ................. | 717/136 |
| 6,785,682 | B2 * | 8/2004 | Todd .......................... | 707/100 |
| 2002/0116354 | A1 * | 8/2002 | Baudu et al. ............... | 706/47 |
| 2002/0138399 | A1 * | 9/2002 | Hayes et al. ............... | 705/37 |

OTHER PUBLICATIONS

Oracle Message Broker for E-Business Integration, An Oracle Technical White Paper, Oct. 1999.*
U.S. Appl. No. 09/969,342, filed Oct. 1, 2001, Delmer et al.
U.S. Appl. No. 09/969,368, filed Oct. 1, 2001, Le et al.
U.S. Appl. No. 09/971,878, filed Oct. 4, 2001, Le et al.
U.S. Appl. No. 10/115,723, filed Apr. 3, 2002, Li et al.
U.S. Appl. No. 10/121,268, filed Apr. 12, 2002, Li et al.

* cited by examiner

*Primary Examiner*—Viet D. Vu

(57) ABSTRACT

A gate-keeping message broker spanning a firewall to provide interconnected message brokering services spanning the firewall. The gate-keeping message broker provides for the creation of an international business transaction information system ("IBTIS") for a user having service needs regarding the relocation of purchased goods across international borders. The IBTIS is configured to work with a plurality of internal service engines and reference servers that are present on both sides of the firewall. The gate-keeping message broker also provides form and syntax validation for messages that it brokers. It further provides content verification and completion services on the content of the messages, the verification being based on business-logic specific to the type of message being brokered.

28 Claims, 5 Drawing Sheets

COMBINED MESSAGE BROKER

The present invention relates generally to software brokerage systems for passing messages, and more particularly, to systems, software and related business methods for handling data in support of international trade.

BACKGROUND OF THE INVENTION

International business transactions frequently lead to the international transportation of goods. The transactions can take place between either related or unrelated business entities, any of whom could be barred from international trade by certain countries or with their citizens and corporations. These goods can be finished products for the consumer market or components for use in manufacture. They likewise can be environmentally sensitive or toxic goods, goods restricted for security reasons, and/or can be packaged in ways that are not acceptable in certain countries. The goods can be subject to export license requirements, import duties, and customs regulations. These issues can arise with each international border crossed by the goods, even goods that are simply in transit through a jurisdiction.

A typical commercial shipment could involve nine different participants, 20 separate documents, 35 customer-vendor interactions and four modes of transport. It could require weeks or months to complete, and can cross numerous international borders. Thus, an elaborate supply chain including manufacturers, distributors, retailers and transportation service providers including freight forwarders, carriers and customs brokers has developed around the world. The resulting global transportation industry is a large and highly complex one, requiring a high level of expertise in a variety of issues that vary from legal jurisdiction to jurisdiction.

In this complex marketplace of services, buyers and/or sellers are frequently relatively inexperienced, lacking knowledge of the wide variety of legal requirements placed on international trade by each country. As a result, a large corporation with thousands of buyers and sellers world wide can have extreme variation in its practices. This potentially leads to noncompliance or inconsistent compliance with the laws of the countries involved in the transaction, excessive delivery times, additional expenses in customs, shipping and brokering, and a failure to recover available tax credits. Furthermore, because transportation procedures are not consistently maintained, little quality control can be exercised in following preferred procedures and hiring better-performing providers. Noncompliance with national laws is a matter of particular importance, as it can lead to both extreme financial penalties and the arrest and incarceration of people ignorantly conducting the transactions violating the laws.

Presently, interaction between importers, exporters and their service providers is primarily conducted via paper, phone and facsimile. The industry lacks industry-based universal formats and standards, and customers use different sets of processes with each service provider. Information from global logistics typically remains disconnected from enterprise systems designed to drive efficiencies across global supply chains.

In attempting to automate and standardize processes, numerous transportation service providers have developed automated processes within their areas of expertise. Such efforts have produced tax services, shipment tracking services, customs invoicing services, duty calculation services, customs classification services, import regulation services, export regulation services, and a large host of other applications. For a customer to take advantage of these applications, each customer (e.g., buyer, seller or related service provider) must realize they have a need to use the package, purchase access to the package, learn to use the package, and provide all relevant information for the package to use. Additionally, because these solutions can be regional in applicability, and because these solutions can be inferior for some types of transactions or locations, while superior for others, their consistent use can be limited in effectiveness.

Related applications are sometimes bundled into a package offering a set of services regarding related subjects. These bundles combine specific point solutions, and therefore adopt their limitations and weaknesses. They each commonly operate without consideration of factors from numerous other areas. For example, packages for estimating costs cannot typically consider the incremental costs incurred in export (e.g., license requirements and restricted party limitations), import (e.g., duties and environmental limitations), logistics (e.g., shipping costs that vary based on a particular customer's pricing agreements), taxes (e.g., customer preferences for claiming "assists," rights in drawbacks, and other tax related activities) and other such issues. Furthermore, even presuming that all customers could be trained and educated on the use of each such bundle, separate business arrangements and technology connections need to be established and maintained for each bundle, adding to the overall cost of conducting international transportation of goods.

Any automation of the process by a corporation using a firewall is hindered by the complexity of the required interactions. The wide array of automated processes offered by different service providers are not standardized, either in function or communication format. To automate the process, large numbers of holes would need to be programmed into the firewall, which is not desirable from either a cost or security standpoint. Additionally, for each application-to-application interaction, software interfaces would need to be programmed, adding significant time and resource costs. This would be true both for the initial development of such an automated system, and for each modification or update to the system. Furthermore, because these applications all have different standards for the form and format of data, significant risk would exist that data would be mishandled or erroneous data would be passed in at least some of the numerous application-to-application interactions.

Accordingly, there has existed a need for an improved system for interfacing the wide variety of automated processes available for the conduct of international business transactions. Such a system would preferably provide for improved speed, accuracy, legality, consistency and legal compliance. Preferred embodiments of the present invention satisfy these and other needs, and provide further related advantages.

SUMMARY OF THE INVENTION

In various embodiments, the present invention solves some or all of the needs mentioned above, providing systems, software and related business methods for handling the international transportation of goods.

A combination message broker system under the invention is configured for use with a firewall and a plurality of internal and external service engines on internal and external sides of the firewall, respectively. The combination message broker includes an internal message broker on the internal side of the firewall, including a communications link to the plurality of internal service engines. It also includes an external message broker on the external side of the firewall, including a communications link to the plurality of external service engines. The invention features a communications link placing the internal message broker and the external message broker in communication.

Both the internal and external message brokers preferably include a number of modules for communicating messages between the various internal and external message engines. In particular, both the internal and external message brokers include a reception module configured to receive messages from the plurality of service engines on their respective sides of the firewall, in a plurality of connection technologies. The internal and external message brokers also include mapping modules configured to map each received message to a format meeting an internal-broker data standard and an external-broker data standard, respectively. Similarly, internal and external message brokers also include data extraction modules configured for determining each destination to which each message should be routed, and configured to map each message to a format meeting standards of each determined destination. Finally, the internal and external message brokers include data transfer modules configured to send messages to each determined destination using connection technologies appropriate to each destination.

Advantageously, the above features allow for communication between service engines operating under different operating systems (such as unix, MVS and MPE), and with different messaging formats. This communication does not require the service engines to be reprogrammed, and thus new connections can be quickly and efficiently established, and maintenance costs can be held to a minimum. Because service engines (and their service application providers) can be rapidly replaced, there is negotiating power with service application providers to improve their services and minimize their costs.

Furthermore, data standards can be changed and updated in any service engine or across the platform with only a minimum of reprogramming, and without affecting numerous components or the system as a whole. Also, the intelligent routing of messages allows single transactions to be used in multiple sub-systems and/or across platforms to other systems.

The invention further features a validation module configured to validate the syntax of one or more items of data from some or every received message using a set of data syntax rules. The validation module includes a set of correctable format errors that it searches for when format errors are located. It is configured to correct each message that exhibits one or more of the correctable format errors, providing for improved data quality with a reduced number of rejected messages.

The invention also advantageously features security features. Among them, the external message broker is configured to authenticate that each message received from the external side of the firewall is from an authorized source.

Other features and advantages of the invention will become apparent from the following detailed description of the preferred embodiments, taken with the accompanying drawings, which illustrate, by way of example, the principles of the invention. The detailed description of particular preferred embodiments, as set out below to enable one to build and use an embodiment of the invention, are not intended to limit the enumerated claims, but rather, they are intended to serve as particular examples of the claimed invention.

DETAILED DESCRIPTION OF THE PREFERRED EMBODIMENTS

The invention summarized above and defined by the enumerated claims may be better understood by referring to the following detailed description, which should be read with the accompanying drawings. This detailed description of particular preferred embodiments of the invention, set out below to enable one to build and use particular implementations of the invention, is not intended to limit the enumerated claims, but rather, it is intended to provide particular examples of them.

Typical embodiments of the present invention reside in a message handling system, and related software and business methods, configured for handling complex international trade issues in the import/export of goods across international borders. Preferred embodiments of the invention reside in a system to link and direct certain communications and data objects between various computer software (and/or hardware) service engines, which can be operated and maintained by a variety of entities, and which operate using a variety of data types and communication formats. Additionally, preferred embodiments of the invention reside in the computer system, and related software and business methods recited above when combined with the service engines to form a networked system for guiding a user through tax, license, customs and/or logistics (TLCL) issues, or more broadly all issues raised by a business transaction that might or might not span one or more international borders.

Typically, an embodiment of this invention is used to integrate service engines and full applications into a single seamless set of services. It is configured to provide maximum connectivity and interchangeability with a minimum of programming modifications. It minimizes the security risk that occurs with prolific piercing of a firewall, while handling all necessary data flow requirements. Such an embodiment typically translates between various data types and formats, and provides data validation and error checking. Additionally, some embodiments preferably provide advanced verification and editing technology, efficiently imposing uniform standards consistently throughout a diverse and large corporate environment. This allows a corporation to operate import/export operations efficiently, cost-effectively, and consistently, with full legal compliance, while allowing individual business people and/or customers to conduct their own transactions. It provides centralized TLCL intelligence without surrendering complete control of a transaction to a centralized department disconnected from the business needs and business practices of the individual corporate or private customers.

TLCL SYSTEM EMBODIMENT

Figure 1:
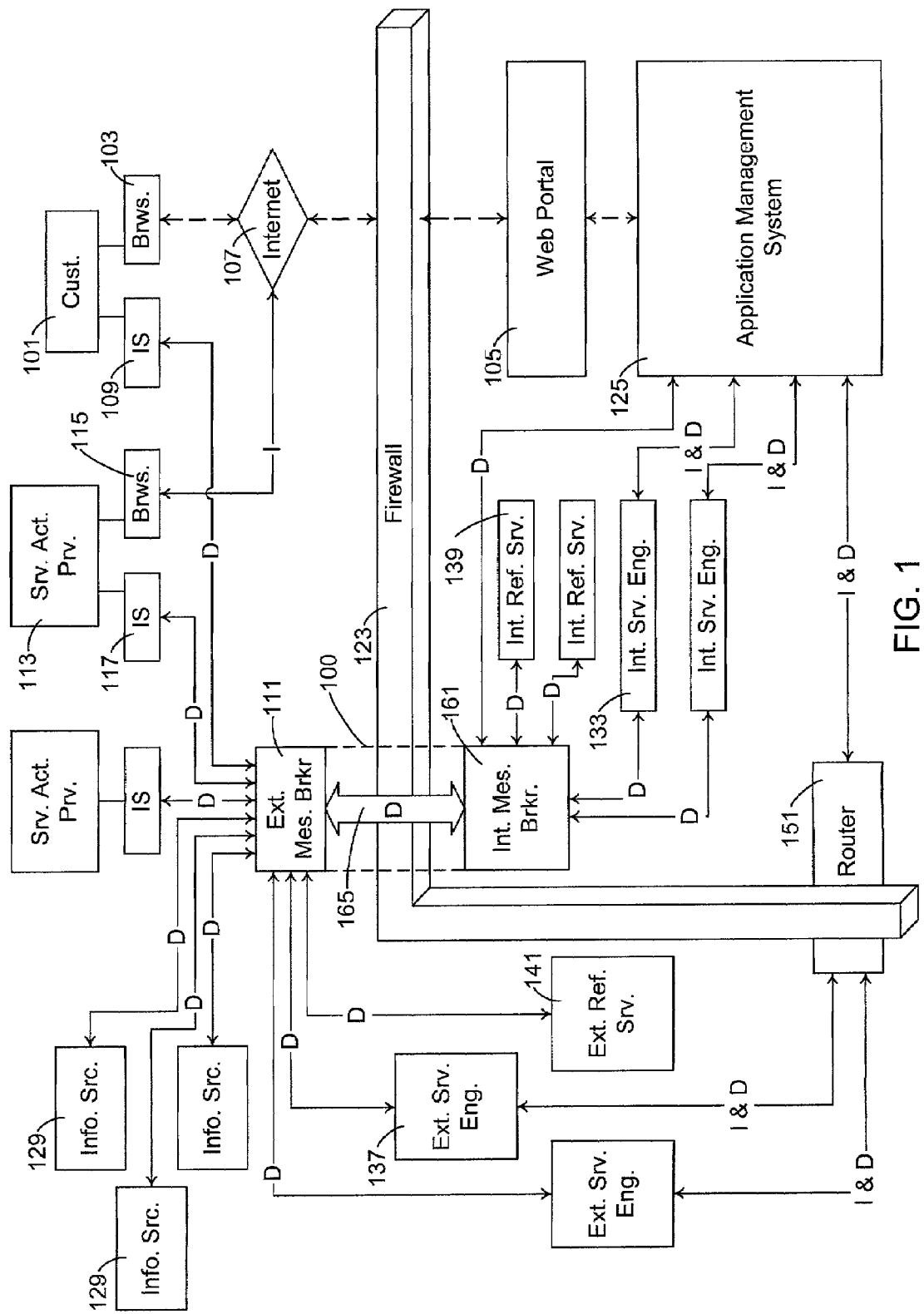
FIG. 1 is a block diagram of a system architecture employing a gate-keeping message system embodying the invention.

With reference to FIG. 1, a preferred embodiment of the invention is a combined message broker that can serve as a gate-keeping message system 100 in a TLCL system, typically being under the control and/or direction of a TLCL System Provider that owns and operates the TLCL system. The TLCL System Provider can be an entity that requires the TLCL services for its own purposes, such as an international conglomerate that has many buyers and/or sellers conducting international business transactions. Alternatively, the TLCL System Provider can be an entity who's primary business is the provision of services to others that requires the TLCL services. Optionally, the TLCL System Provider can simultaneously serve both roles. Preferably, the TLCL System Provider can access the TLCL system both via access to the TLCL system computers, and indirectly via a browser.

Customers 101 use a browser 103 to interactively access a web portal 105 of the TLCL system over the Internet 107. These connections are denoted as being for interactive communication by an "I" in FIG. 1. The Customer is typically a buyer or seller for a large corporation, but it could be another entity. Optionally (or alternatively), the Customers can have information systems 109 configured to communicate with an external message broker 111 of the TLCL system. These Customers are typically individuals who are responsible for arranging international shipments with relation to some type of international business transaction.

The Customer's corporation can be the TLCL System Provider, or a client of the TLCL System Provider. Other users of the TLCL system can be any of a variety of service providers that aid the Customers with their international shipments. For example, a Customs Broker or other Service Activity Provider 113, who also uses a browser 115 or information system 117 to contact the TLCL system, can be a user. A Customer will typically begin an international shipment either by directly entering transaction information into the TLCL system or by entering the information in their local purchasing software (i.e., their information system) that in turn transmits the information to the TLCL system. Alternatively, a user such as a Customs Broker can enter the information, such as might be received in a financial invoice on a shipment. In some embodiments, other users could include an indirect Customer of the TLCL system such as an end purchaser of a product (i.e., a consumer).

Typical embodiments of the TLCL system will include a network of computer hardware and software, characterized by an architecture defining a firewall 123, the web portal 105, and an application management system 125 having functions including that of an application server. A variety of TLCL functions are conducted by the application management system through the use of a plurality of service engines, which can include the engines underlying other applications. Included among these are one or more internal service engines 133 that are within the firewall, and one or more external service engines 137 that are outside the firewall. Internal or external devices that only conduct data-type processing in response to the receipt of requests representing various relevant queries are referred to as internal reference servers 139 and external reference servers 141, respectively. However, while these devices are typically serving in a database capacity, they might conduct some processing to meet the requirements of some queries. The data used by the service engines is kept up-to-date via data communications with information sources 129.

In operation, the internal service engines 133 receive messages directly from the application management system 125, each message containing data representing an event. The external service engines 137 preferably receive messages from the application management system via a router 151, providing for a single hole in the firewall to accommodate the interactive communications between the user and the external service engines. Optionally, some external service engines could be in communication with the application management system application management system through separate holes in the firewall that are not maintained by the router.

The application management system 125 provides e-services to a user, directing, buffering and processing various interactive communications between the users and the service engines 133 and 137. The application management system interactively communicates with the users via the web portal 105. Additionally, the application management system 125 provides e-services to the user via the user's information system. To do so, it receives messages from the information system and then directs various activities by the service engines 133 and 137 in response to the messages.

The firewall 123, the web portal 105 and the application management system 125 each provide authentication and security tasks for verification of the users' interactive usage rights in the TLCL system. In particular, the firewall includes a web agent that limits web portal access to verified users, thus serving as a gatekeeper to the web portal. The web portal 105 also includes a web agent, which limits the general types of tasks that each user is allowed to conduct according to assigned usage rights. Finally, the application management system governs the operation of the service engines, limits access to the particular sub-functions and information for which the user has approved access in the service engines.

For example, when a Customs Broker accesses the TLCL system using its browser 115, the firewall web agent verifies that the Customs Broker is within the group of approved users, and then allows the Customs Broker access to the web portal. At the web portal, the Customs Broker is provided a set of TLCL operations to which the Customs Broker has access. The extent of that set of options is governed by the web agent of the web portal 105 according to the services that the Customs Broker has purchased or been allowed. After the Customs Broker selects a function, such as customs invoice generation, the application management system 125 leads the Customs Broker through a series of interactions with a series of service engines. The application management system web agent controls the Customs Brokers access to the individual functions within each service engine based on the Customs Brokers approved access. The application management system web agent further controls the Customs Brokers access, limiting it to data that the Customs Brokers is allowed to access. Thus, security and authentication over interactive communications are conducted in several levels.

Service Engines

The application management system is preferably configured to work with a plurality of the internal service engines 133 and a plurality of the external service engines 137. Each service engine is configured to provide one or more e-services relating to one or more TLCL issues that arise in international import and/or export business transactions. At least some service engines are the functional portions of applications that include user interfaces for separate access to the application.

Some service engines may be designed and written by (or under the direction of) the TLCL System Provider. Such service engines are generally operated within the firewall by employees or contractors of the TLCL System Provider. Other service engines might be applications written and owned by outside software developers, but are significantly altered to meet the functional needs and/or the connection requirements of the TLCL system. These service engines could readily be either inside or outside the firewall, most likely depending upon the party that operates the service engine.

Finally, some service engines are likely to be part of applications that are entirely owned and operated by outside entities. These entities could be Application Service Providers having expertise in some segment of the import/export industry, or even Customers 101 or Service Activity Providers 113 who are selling their information and expertise for additional profit. Therefore, while the external service engines 137 are depicted separately, it should be understood that they could reside in the information systems 109 or 117 of the Customers or Service Activity Providers.

Additional details of the TLCL system, and variations thereof, are contained in a patent application Ser. No. 09/969,369 entitled "International Trade System", filed Oct. 1, 2001, which is hereby incorporated herein by reference.

Details of the Gate-Keeping Message System

Each service engine 133 or 137 is interconnected via connections configured for communicating requests and replies (e.g., database queries and related processing), and/or data objects. These data connections are denoted as being for data transfer by a "D" in FIG. 1. Depending on the type of data transfer, data-type communications are conducted either via the gate-keeping message system 100 or the application management system 125.

Figure 2:
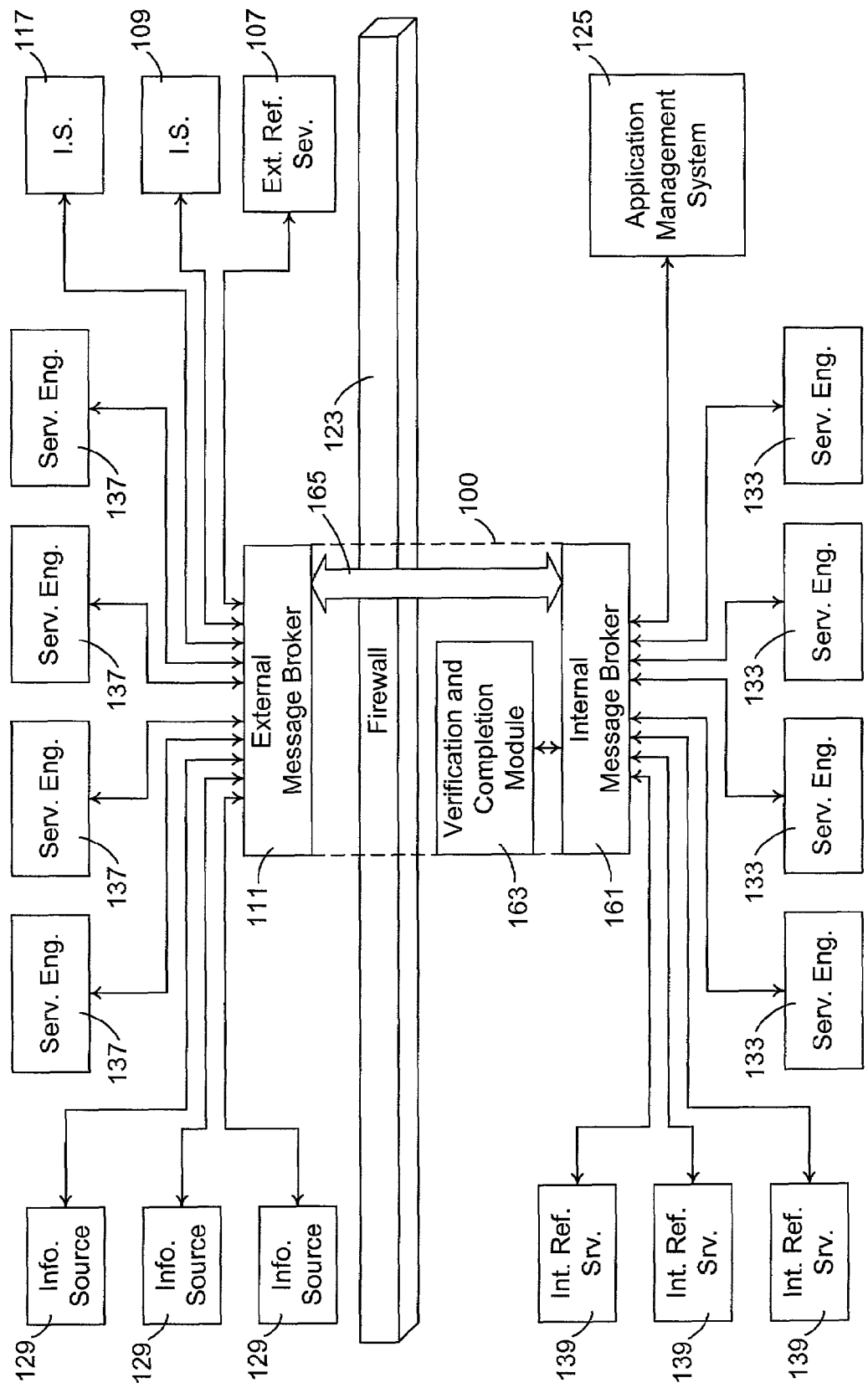
FIG. 2 is a block diagram of the embodiment of the gate-keeping message system depicted in FIG. 1, within a larger network of devices.

With reference to FIGS. 1 and 2, the gate-keeping message system 100 preferably includes an internal message broker 161, a data verification and completion module 163, and the external message broker 111. These two portions of the gate-keeping message system are linked via a data-type communications link 165 passing through (and forming) a hole in the firewall 123. The internal message broker is in data-type communication with the internal reference servers 139, the internal service engines 133 and the application management system 100. Likewise, the external message broker 111 is in data-type communication with the external reference servers 141 and the external service engines 137, as well as the information sources 129 and the information systems of the Customers 101 and Service Activity Providers 117. Through the gate-keeping message system, preferably all these entities can be kept in data-type communications through a single hole in the firewall.

To direct particular queries to which a service engine 133 or 137 requires a reply, such a query is sent by the requesting service engine to the message broker portion of the gate-keeping message system 100 on the same side of the firewall as the requesting service engine. The gate-keeping message system then directs the query to the appropriate, replying service engine or reference server 139 or 141 to reply to the request. If the replying service engine or reference server is on the opposite side of the firewall from the requesting service engine, then the request is appropriately passed by the communications link 165 between the internal and external broker portions of the gate-keeping message system. Similarly, when the reply is generated by the replying service engine or reference server, it is sent to the message broker portion of the gate-keeping message system on the same side of the firewall as the replying service engine or reference server, and then directed to the requesting service engine, passing through the firewall via the gate-keeping message system if necessary.

The gate-keeping message system 100 and the application management system 125 each provide authentication and security tasks for verification of the users' messaging usage rights in the TLCL system. In particular, the gate-keeping message system limits access to verified users and limits the general types of events that each user is allowed to submit in a message. Cleared messages pass from the gate-keeping message system to the application management system, which limits usage to the particular sub-functions and information for which the user's events have approved access.

Once the application management system 125 receives the event, it directs the processing of the event through various service engines 133 and 137, as appropriate. The application management system will select the appropriate service engines to contact based upon the type of event that the data represents (e.g., a financial invoice, a status update on a shipment or a notification received from a particular country's customs service) and the content of the data (e.g., the exporting and importing countries, the nationalities and/or identities of the buyer and seller, the classification and type of goods, the value of the goods and the toxic or environmental relevance of the goods). In the subsequent processing of the event, additional events and queries can be generated.

The information sources 129, which are typically governmental or private entities outside the firewall 123, are also linked in communication with the external message broker 111 via connections configured for communicating data objects (denoted as being for data transfer by a "D" in FIG. 1). In some cases, they can generate events such as update notifications, sending those events to the application management system via the external and internal message brokers. Additionally, service engines and/or reference servers can query the information sources for information.

The application management system 125 provides authentication and security for verification of each service engines usage rights in the TLCL system with relation to a given event. In particular, the application management system, which governs the operation of the service engines, controls the selection of service engines that receive an event. The application management system then polices the events passed from one service engine to another.

External Message Broker

Figure 3:
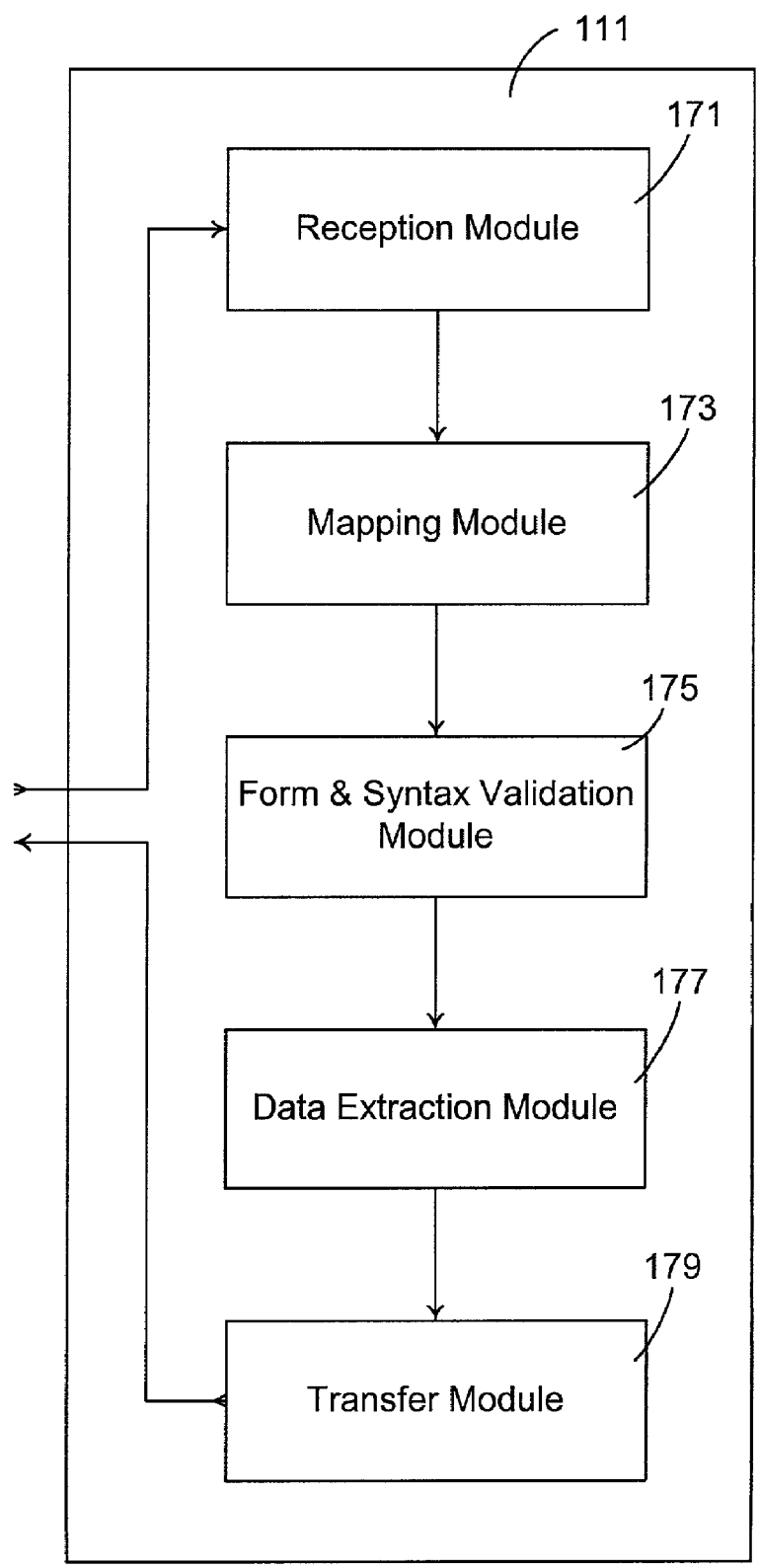
FIG. 3 is a block diagram of an external message broker of the gate-keeping message system diagramed in FIG. 2.

With reference to FIGS. 2 and 3, the external message broker 111 can receive messages from the external service engines 137, the information sources 129, the information systems 109 or 117 of users, the external reference servers 107 and the internal message broker 161. The external message broker preferably includes modules implementing five primary functions. The first module is a reception module 171, which provides connection technology for connecting to a diverse set of data sources. The reception module is preferably configured to accept data in frameworks and/or formats such as: RosettaNet, electronic data interchange ("EDI"), flat files, spreadsheets, extensible markup language ("XML"), BizTalk, and CommerceNet. The set of supported frameworks and/or formats include all that are required to communicate with all devices linked in communication with the external message broker.

Along with accepting messages, the reception module preferably provides for message authentication. For messages received from the external service engines 137, the information sources 129, the information systems 109 or 117 of users, and the external reference servers 107, the module limits access to messages authenticated to be from authorized sources (e.g., messages authenticated to be from appropriate users, external service engines, and the like).

The second module is a mapping module 173. The mapping module is configured for mapping inbound messages from their original format to an internal data standard (i.e., an internal application message format). While the module could support multiple internal data standards, preferably a single internal data standard is implemented, and preferably that standard is in conformity with contemporary industry standards.

The third module is a form and syntax validation module 175 that validates the form and syntax of the data. In particular, with the data mapped to an internal data standard, the data is validated against basic data standard rules. For example, data in date fields are checked to assure that they contain valid dates. Likewise, the validity of the message itself is checked by reviewing whether it has data in all required fields. Any message that is found invalid, either for having invalid data or for lacking required data, is preferably routed back to its source with an indication of the validation error.

The fourth module is a data extraction module 177. This module includes logic for determining the routing of each message based on its source and event type, as well as whether it passed the validation step that it underwent in the preceding module. Using this logic, one or more destinations for the data are determined. If the message failed to pass the validation to which it was subjected, then the message is routed either back to its source or onto a specialist, depending on how it was flagged. If it passed data validation, then based on the data content and format requirements of each determined destination, the extraction module extracts data from the message in the internal data standard, and then maps it to the required format for that destination.

The fifth module is a data transfer module 179. This module provides connection technology for delivering data to a diverse set of data destinations. It can send messages via protocols such as ftp, batchnet, and the like. The transfer module is preferably configured to deliver data in frameworks and/or formats such as: RosettaNet, electronic data interchange ("EDI"), flat files, spreadsheets, extensible markup language ("XML"), BizTalk, and CommerceNet. This allows for each external service engine to operate with the TLCL system using only a single connection and a single messaging format.

While these modules are described as distinct units, it should be understood that they can be implemented in numerous configurations and varying orders. For example, message validation can occur prior to or during the mapping of the data to the internal data standard. Likewise, the routing logic could be broken out into a distinct module rather than being broken up between the validation, extraction and transfer modules.

Generally, the external message sources are outside the control of the TLCL System Provider. Therefore, the TLCL system will not typically be configured for monitoring and assisting any direct communications between the external sources, other than the communications directed and controlled by the application management system 125. However, the external message broker 111 can also be operated by a service provider other than the TLCL System Provider, and that service provider might arrange for the external message broker to serve as an interface between various service engines operated by other service providers. Additionally, the TLCL System Provider might contract with various Application Service Providers to have their service engines operate with the service engines of others when handling transactions for the TLCL system. Such arrangements might include messaging via the external message broker.

As noted above, the external message broker might not serve to broker messages between outside sources. In such cases, most or all messages from external sources will pass from the external message broker 111 to the internal message broker 161, and then either to the application management system 125 or alternatively to various internal service engines 133 or reference servers 139.

Internal Message Broker

Figure 4:
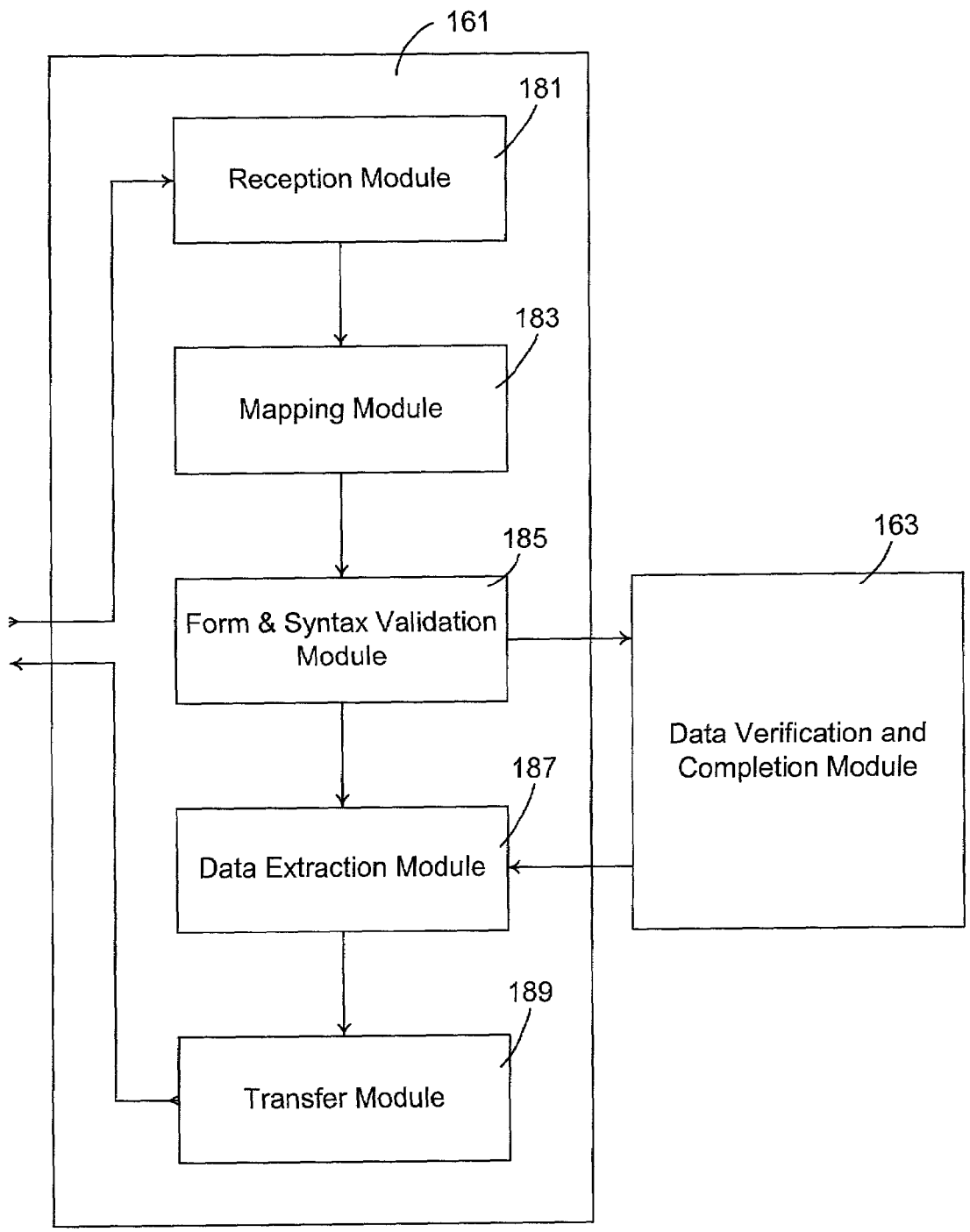
FIG. 4 is a block diagram of an internal message broker and a verification and completion module of the gate-keeping message system diagramed in FIG. 2.

With reference to FIGS. 2 and 4, the internal message broker 161 can preferably receive messages from the internal service engines 133, the internal reference servers 139 and the external message broker 111. Depending on the configuration, the internal message broker might also receive messages from the application management system 125.

The internal message broker 161 preferably includes modules implementing five primary functions that are similar, although not necessarily identical to, the functions of the external message broker. The first module is a reception module 181, which provides connection technology for connecting to a diverse set of data sources. The reception module is preferably configured to accept data in the frameworks and/or formats such as: RosettaNet, electronic data interchange ("EDI"), flat files, spreadsheets, extensible markup language ("XML"), BizTalk, and CommerceNet. The set of supported frameworks and/or formats include all that are required to communicate with all devices linked in communication with the internal message broker.

Along with accepting a message, the reception module 181 preferably provides for authentication and verification of message rights. For queries and/or messages received from internal sources, the internal message broker verifies that the source of the message has the right to create that type of message. For messages received from outside sources, it conducts this same validation function, and provides authentication of the sources rights to access the TLCL system. It thus limits access to messages from verified users and other sources, serving as a gatekeeper to the internal TLCL system. Messages from external users that gain access then pass through the remaining modules and onto the application management system 125, where further security checks are conducted, such as verifying the message sender's rights to operate particular service engines and access particular data.

Similar to the external message broker 111, the second module of the internal message broker 161 is a mapping module 183. The mapping module is configured for mapping inbound messages in an initial format to an internal data standard (i.e., an internal application message format). While the module could support multiple internal data standards, preferably a single internal data standard is implemented, and preferably that standard is in conformity with contemporary industry standards. More preferably, the internal message broker and the external message broker are configured to operate with the same internal data standard, or at least a closely related internal data standard, thus allowing for communication with a minimum of data translation.

The third module is a form and syntax validation module 185 that validates the form and syntax of the data. In particular, with the data mapped to an internal data standard, the data is validated against basic data standard format rules. For example, data in date fields are checked to assure that they contain valid dates. Likewise, the validity of the message itself is checked to verify that data is present in all required fields.

In addition to validating the data with the data-standard rules, the contents of the fields are reviewed against data requirements of the TLCL service engines. Such a review typically compares the content of each field to the substance of the internal data standard itself, rather than simply its data format. For example, the verification could examine the type of country code used (e.g., under different standards, Germany could be designated as DE or "276"). This requires the validator to go beyond simple format requirements, and visit the nature of each event. Logic for this type of check can be based on META data, which could include the type of event and/or its intended routing.

Any message having invalid or inadequate data is compared with a table of correctable data problem types, and correction algorithms are followed if available. For example, dates that have recognizable, though incorrect, formats are reformatted to the correct format. For messages that contain incorrect data that is not of a correctable type, the module can be configured either to flag the message to be routed back to its source with an indication of the error, or routed to a team of one or more (live) specialists that will examine and correct the problem, if possible. In some embodiments, either of these flags can be selected, depending on the type of error detected. For example, a message that is missing data fundamental to the transaction (such as any indication of the goods) can be routed back to the sender, while a message that is missing correctable data (such as classification data) might be flagged for routing to a specialist.

For each message that passes the form and syntax validation, the message type and/or message source are reviewed against a table of message types and/or sources designated to receive substantive content verification (including correction and/or completion if necessary). For such messages, the form and syntax validation module 185 of the internal message broker forwards the message to the data verification and completion module 163 of the gate-keeping message system 100. Messages that are not designated to receive content verification are forwarded to the fourth module of the internal message broker 161.

As described below, the verification and completion module 163 verifies that the substantive content of the message meets certain logical requirements, and attempts correction of messages that fail to meet those requirements. Regardless of whether the message met the logical requirements, or whether a correction was successfully implemented, the message is passed to the fourth module of the internal message broker 161, along with an indication of whether the message, as corrected if necessary and possible, meets the logical requirements. As with the form and syntax validation module 185, the verification and completion module 163 can flag a message that failed verification either for return to its source or for routing to a specialist.

The fourth module is a data extraction module 187. This module includes logic for determining the routing of each message based on its source and META data (e.g., event type), as well as whether it passed the validation and/or verification steps that it underwent in the preceding modules. Using this logic, one or more destinations for the data are determined. If the message failed to pass the various validation and/or verification steps to which it was subjected, then the message is routed either back to its source or on to a specialist, depending on how it was flagged. If it passed data validation and/or verification, then based on the data content and format requirements of each determined destination, the extraction module extracts data from the message in the internal data standard, and then maps it to the required format for that destination.

The fifth module is a data transfer module 189. This module provides connection technology for delivering data to a diverse set of data destinations. It can send messages via protocols such as ftp, batchnet, and the like. The transfer module is preferably configured to deliver data in frameworks and/or formats such as: RosettaNet, electronic data interchange ("EDI"), flat files, spreadsheets, extensible markup language ("XML"), BizTalk, and CommerceNet. This allows for each external service engine to operate with the TLCL system using only a single connection and a single messaging format.

While these internal message broker modules are described as distinct units, it should be understood that they can be implemented in numerous configurations. For example, data validation and/or verification can occur prior to or during the mapping of the data to the internal data standard. Likewise, the routing logic could be broken out into a distinct module rather than being broken up between the validation, extraction and transfer modules.

The above modules also provide various logging and archiving facilities. For example logs are kept of error generation, allowing for a later analysis of common sources and causes of errors. Likewise, by keeping track of message processing and routing, message tracking status checks can be run. Furthermore, archiving of both the message input and output provides both for functional needs, such as sending back the original message when it fails a validation or verification check, and compliance requirements, in the maintenance of records for auditing.

Generally, the external message broker 111 does not provide content validation (of TLCL service engine requirements), or substantive data verification (and correction), as do the internal message broker 161 and the verification and completion module 163. This is appropriate for typical TLCL systems, where the system will not be configured for monitoring and assisting any direct communications between the external sources other than the communications directed and controlled by the application management system 125. However, in alternative embodiments, the gate-keeping message system 100 can be configured to provide such content validation, verification and correction to outside sources.

One means for providing content validation and/or verification for messages being brokered between external sources and targets by the external message broker 111, is to rout all such messages from the external message broker to the internal message broker 161 for content validation and/or substantive verification. After this validation and/or verification, the messages are then routed back to the external message broker to complete the brokering process. Another means for providing content validation and/or substantive verification for messages being brokered between external sources and targets by the external message broker, is to configure a direct link between the external form and syntax validation module 175, or some other portion of the external message broker, to the data verification and completion module 163.

Data Verification and Completion Module

The verification and completion module 163 verifies that the substantive content of a message meets certain business-logic requirements related to the type of event contained in the message and its source or intended destinations. This provides a deeper level of review than a typical data validation step that examines form rather than substance. Typically, such a verification will involve comparisons between the content of multiple fields, and will include considerations of the legal requirements of transactions in various jurisdictions. For example, if the country codes indicate that the transaction is between European countries, the monetary fields could be verified to be in Euros rather than in local currency. Likewise, if the monetary fields include both line items and totals, then the totals can be verified to agree with the line items.

Because verification can occur for each message, an event relating to a given business transaction will likely see multiple verifications or different types at different times. For example, when a message containing an initial financial transaction arrives, it might receive a verification check establishing that its line items add up to its totals. Further processing occurs and additional messages are created for the transaction. After one service engine establishes that the exporter has an export license and another service engine prepares a customs invoice, the classification information developed in each of these procedures could be compared to verify that they are compatible.

Any message that does not pass its verification is compared with a table of correctable data problem types, and correction algorithms are followed if available. These corrections can change incorrect data, add additional data as can be determined, and remove extraneous data. For messages that fail a verification and are not of a correctable type, the module preferably routs the message to a team of one or more specialists that examine and resolve the problem.

Additional Aspects of the Invention

In the first disclosed embodiment, an application management system, an internal message broker and a set of service engines are described as within a single, global firewall. However it should be understood that the architecture of corporate networks can take many forms, with multiple layers of firewall or numerous local firewalls instead of a single, global firewall. The present gate-keeping message system can be implemented in different forms, such as connecting in a distributed sense across various forms of network architecture. For example, for the purposes of this description, two network systems that are each protected from a public network by a firewall, and that are in communication through secure communications channels, are simply one network behind a firewall, and the gate-keeping message system operates in the same manner. Likewise, the overall system might be distributed between nested firewall levels or other types of configurations. Again, varied configurations, where the gate-keeping message system operates to connect between two different layers and/or serves to provide validation and/or verification services, are within the scope of the invention.

Furthermore, while Customers are described above as buyers or sellers, other entities might act as Customers. For example, Service Activity Providers or even Application Service Providers could become Customers to provide their respective Customers with the benefits of the available TLCL solutions. Indeed, such Customers might find the TLCL solution to be superior to their in-house software for some purposes, and incorporate the system into their regular procedures.

ADDITIONAL EMBODIMENTS

In additional embodiments of the invention, some or all of the elements of the above-described embodiment are combined with additional communication mechanisms to add further functionality to the system with a minimum of additional cost, effort or risk to reliability and legal compliance.

Figure 5:
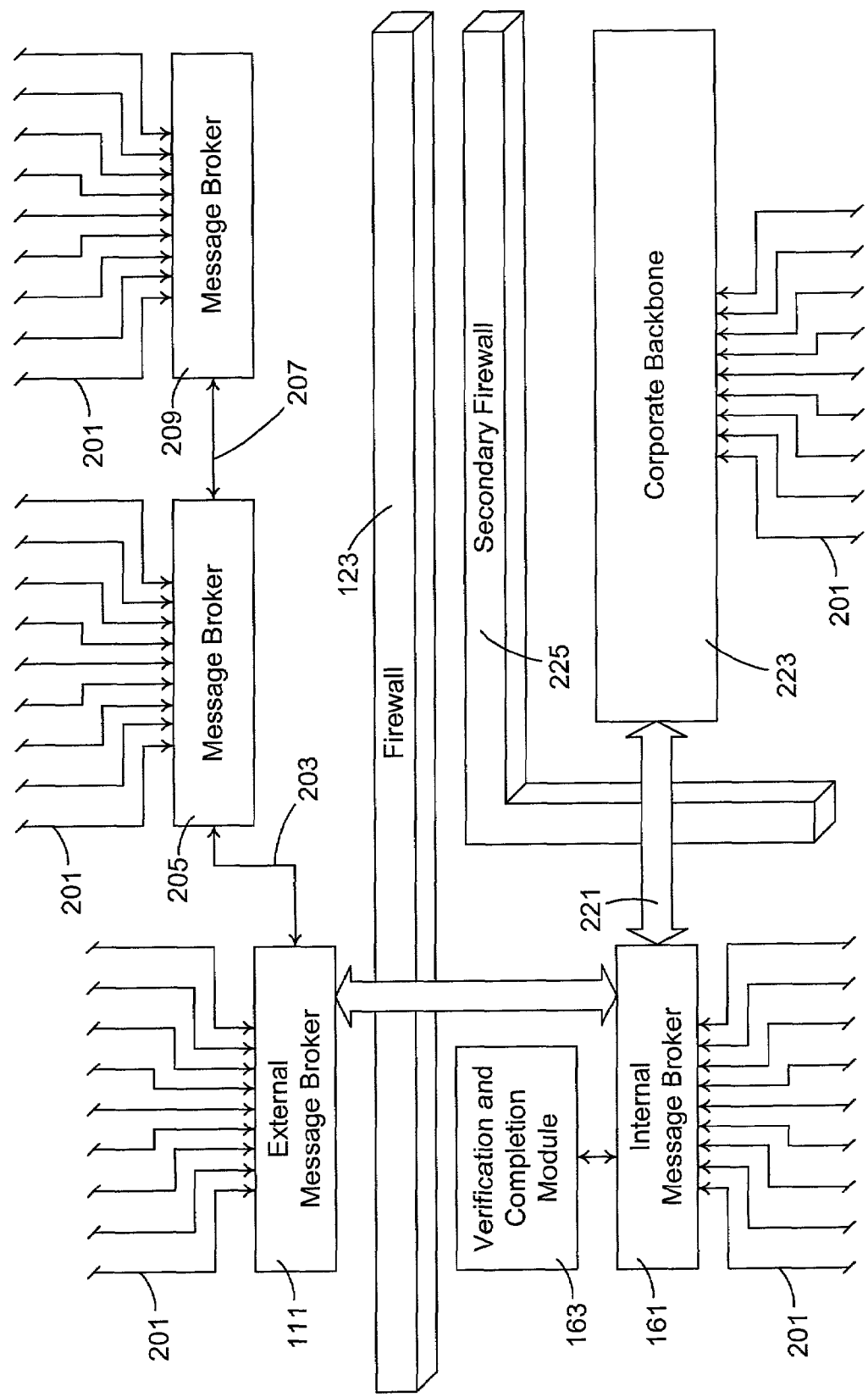
FIG. 5 is a block diagram of a second embodiment of a gate-keeping message system of the invention.

With reference to FIG. 5, the second embodiment preferably includes the external message broker 111, the internal message broker 161 and the verification and completion module 163 of the prior embodiment, preferably interconnected similarly to the way described above. Preferably, although not necessarily, they are likewise configured spanning the firewall 123. The external message broker and internal message broker each include a plurality of connections 201 placing them in communication with service engines, reference servers, and other sources and destinations of data, such as those described above.

Among the connections 201 of the external message broker 111, one or more such connections 203 preferably directly link the external message broker to, and places it in direct communication with, one or more additional message brokers 205 that are external to the firewall. Those one or more directly connected message brokers 205 also have a plurality of connections 201 placing them in communication with service engines, reference servers, and other sources and destinations of data, such as those described above. Optionally, they too can have one or more connections 207 that link the additional external message brokers to, and places them in communication with, other, indirectly connected message brokers 209 that are external to the firewall and have a plurality of connections 201 placing them in communication with service engines, reference servers, and the like.

Both the directly connected message brokers 205 and the indirectly connected message brokers 209 provide a diverse set of connections to add to the versatility of the gate-keeping message system 100. They provide for the use of message brokers having expertise and existing business relationships in particular areas of international business transactions or particular areas of the world. This advantageously limits the cost and time required to develop new connections and business relationships when the overall TLCL system grows, changes and improves. Furthermore, the routing logic can be established such that routing between two service engines and/or applications can be sent through validation and/or verification checking within the firewall, even if the two service engines and/or applications are both on one or more indirectly connected message brokers.

Among the connections 201 of the internal message broker 161, one or more such connections 221 preferably directly link the external message broker to, and places it in direct communication with, one or more corporate backbones 223 within the firewall. The backbone may be behind a secondary firewall 225 such that it is at either a higher or lower level of security than the internal message broker. The backbone also has a plurality of connections 201 placing it in communication with other types of systems and services, which can also be at varying levels of security behind other firewalls. This is of particular use for an in-house system, where the TLCL system is but one of many functional systems that may have reasons to share transactions.

Each of the other functional systems preferably has a related message broker that brokers all transactional data passing between that system and the corporate backbone.

Each such broker can have related verification modules configured with logic appropriate to the types of events to which the functional system pertains.

For example, there might be financial systems that, among their other functions, make payments for business transactions. Likewise, there might be tax and accounting packages that require record keeping reports from business transactions. Furthermore, other areas such as inventory management, project staffing and business planning all might have needs and uses for event messages passing through the gate-keeping message broker. Thus, through the internal extension to the gate-keeping message broker and/or its verification function, the value of the message data can be leveraged into all areas of the corporation.

If the gate-keeping message broker is to be leveraged into other systems, another embodiment would either use the corporate backbone as the internal message broker to receive all messages from the external message broker, or use a message broker dedicated to the task of interfacing with the corporate backbone. The corporate backbone could then rout messages appropriately to specific systems (such as the TLCL system), and preferably to system-specific message brokers that preferably include verification modules appropriate to their systems.

Invention

In the various embodiments described above, it is to be understood that the invention comprises various apparatus, software and methods for designing setting up, managing and operating gate-keeping message systems, along with the business methods enabled by them, and further for the designing, setting up, managing and operating of TLCL systems implementing a gate-keeping message system. Additionally, the invention comprises apparatus, software and methods related to using the services of TLCL service engines and their supporting architecture. In short, the above disclosed features can be combined in a wide variety of configurations and relate to a wide variety of licensees within the anticipated scope of the invention.

While particular forms of the invention have been illustrated and described, it will be apparent that various modifications can be made without departing from the spirit and scope of the invention. Thus, although the invention has been described in detail with reference only to the preferred embodiments, those having ordinary skill in the art will appreciate that various modifications can be made without departing from the scope of the invention. Accordingly, the invention is not intended to be limited by the above discussion, and is defined with reference to the following claims.

We claim:

1. A combination message broker system for use with a firewall defining an internal side and an external side, and a plurality of service engines including a plurality of internal service engines being located on the internal side of the firewall and a plurality of external service engines being located on the external side of the firewall, individual service engines of the internal and external pluralities of service engines being configured to transmit messages intended for receipt by other service engines of the internal and external pluralities of service engines, comprising:

an internal message broker on the internal side of the firewall, the internal message broker including a communications link to the plurality of internal service engines, wherein the internal message broker is configured to route each message it receives toward the other service engine intended for receipt of that message;

an external message broker on the external side of the firewall, the external message broker including a communications link to the plurality of external service engines, wherein the external message broker is configured to route each message it receives toward the other service engine intended for receipt of that message; and a communications link placing the internal message broker and the external message broker in communication;

wherein the message broker system is configured to translate messages from data formats in which they are received by the message brokers to data formats suitable for the service engines intended for receipt of the messages.

2. The combination message broker system of claim 1, wherein the internal message broker includes one or more modules, including:

a reception module configured to receive messages from the plurality of internal service engines in a plurality of connection technologies;

a mapping module configured to map each received message to a format meeting an internal-broker data standard;

a data extraction module configured for determining each destination to which each message should be routed, and configured to map each message to a format meeting standards of its determined destination for each such determined destination; and a data transfer module configured to send messages to each determined destination using a connection technologies appropriate to each destination.

3. The combination message broker system of claim 2, wherein the external message broker includes one or more modules, including:

a reception module configured to receive messages from the plurality of external service engines in a plurality of connection technologies;

a mapping module configured to map each received message to a format meeting an external-broker data standard;

a data extraction module configured for determining each destination to which each message should be routed, and configured to map each message to a format meeting standards of its determined destination for each such determined destination; and a data transfer module configured to send messages to each determined destination using connection technologies appropriate to each destination.

4. The combination message broker system of claim 3, wherein the internal data standard is the same as the external data standard.

5. The combination message broker system of claim 4, wherein:

the internal message broker further includes a validation module configured to validate the syntax of one or more data of each received message using a set of syntax rules;

the validation module is configured to identify a set of correctable format errors in the format of each message, and is configured to correct each message that exhibits one or more of the correctable format errors; and the external message broker is configured to authenticate each message received from the external side of the firewall to be from an authorized source.

6. The combination message broker system of claim 2, wherein the internal message broker further includes a validation module configured to validate the syntax of one or more data of each received message using a set of syntax rules.

7. The combination message broker system of claim 6, wherein the validation module is configured to identify a set of correctable format errors in the format of each message, and is configured to correct each message that exhibits one or more of the correctable format errors.

8. The combination message broker system of claim 1, wherein the external message broker is configured to authenticate each message received from the external side of the firewall to be from an authorized source.

9. The combination message broker system of claim 1, wherein the plurality of service engines includes a second plurality of external service engines, wherein:
the external message broker is configured with a communications link to a second external message broker on the external side of the firewall, the second external message broker including a communications link to the second plurality of external service engines.

10. The combination message broker system of claim 1, wherein the plurality of service engines are integrated to form a first integrated service engine, and wherein the combination message broker system is further configured for use with a second plurality of service engines integrated to form a second integrated service engine using a second internal message broker, wherein:
the first internal message broker is configured with a communications link to a backbone on the internal side of the firewall, the backbone having a communication's link to the second internal message broker to place the first integrated service engine in communication with the second integrated service engine.

11. The combination message broker system of claim 10, wherein the backbone is separated from the first internal message broker by a firewall.

12. A method for linking, across a firewall defining an internal side and an external side, a plurality of service engines including a plurality of internal service engines being located on the internal side of the firewall and a plurality of external service engines being located on the external side of the firewall, individual service engines of the internal and external pluralities of service engines being configured to transmit messages intended for receipt by other service engines of the internal and external pluralities of service engines, comprising:
connecting the plurality of internal service engines to an internal message broker on the internal side of the firewall via a communications link, wherein the internal message broker is configured to route each message it receives toward the other service engine intended for receipt of that message;
connecting the plurality of external service engines to an external message broker on the external side of the firewall via a communications link, wherein the external message broker is configured to route each message it receives toward the other service engine intended for receipt of that message; and
connecting the internal message broker to the external message broker via a communications link placing the internal message broker and the external message broker in communication through the firewall;
wherein the combined internal and external message brokers are configured to translate messages from data formats in which they were received by the message brokers to data formats suitable for the service engines intended for receipt of those messages.

13. The method of claim 12, wherein the internal message broker includes one or more modules, including:
a reception module configured to receive messages from the plurality of internal service engines in a plurality of connection technologies;
a mapping module configured to map each received message to a format meeting an internal-broker data standard;
a data extraction module configured for determining each destination to which each message should be routed, and configured to map each message to a format meeting standards of its determined destination for each such determined destination; and
a data transfer module configured to send messages to each determined destination using a connection technologies appropriate to each destination.

14. The method of claim 13, wherein the external message broker includes one or more modules, including:
a reception module configured to receive messages from the plurality of external service engines in a plurality of connection technologies;
a mapping module configured to map each received message to a format meeting an external-broker data standard;
a data extraction module configured for determining each destination to which each message should be routed, and configured to map each message to a format meeting standards of its determined destination for each such determined destination; and
a data transfer module configured to send messages to each determined destination using connection technologies appropriate to each destination.

15. The method of claim 14, wherein the internal data standard is the same as the external data standard.

16. The combination message broker system of claim 1, wherein the plurality of service engines includes a second plurality of external service engines, and wherein:
the external message broker is configured with a communications link to a second external message broker on the external side of the firewall, the second external message broker including a communications link to the second plurality of external service engines.

17. The combination message broker system of claim 1, wherein the combined internal and external message brokers provide the sole data-type direct connection between the internal and external service engines.

18. The combination message broker system of claim 5, wherein the syntax rules are based on the nature of each message.

19. A combination message broker system for use with a firewall defining an internal side and an external side, and a plurality of service engines including a plurality of internal service engines being located on the internal side of the firewall and a plurality of external service engines being located on the external side of the firewall, comprising:
an internal message broker on the internal side of the firewall, the internal message broker including a communications link to the plurality of internal service engines;
an external message broker on the external side of the firewall, the external message broker including a communications link to the plurality of external service engines; and
a communications link placing the internal message broker and the external message broker in communication;

wherein the internal message broker includes one or more modules, including:
a reception module configured to receive messages from the plurality of internal service engines in a plurality of connection technologies,
a mapping module configured to map each received message to a format meeting an internal-broker data standard,
a data extraction module configured for determining each destination to which each message should be routed, and configured to map each message to a format meeting standards of its determined destination for each such determined destination, and
a data transfer module configured to send messages to each determined destination using a connection technologies appropriate to each destination.

20. The combination message broker system of claim 19, wherein the external message broker includes one or more modules, including:
a reception module configured to receive messages from the plurality of external service engines in a plurality of connection technologies;
a mapping module configured to map each received message to a format meeting an external-broker data standard;
a data extraction module configured for determining each destination to which each message should be routed, and configured to map each message to a format meeting standards of its determined destination for each such determined destination; and
a data transfer module configured to send messages to each determined destination using connection technologies appropriate to each destination.

21. The combination message broker system of claim 20, wherein the internal data standard is the same as the external data standard.

22. The combination message broker system of claim 21, wherein:
the internal message broker further includes a validation module configured to validate the syntax of one or more data of each received message using a set of syntax rules;
the validation module is configured to identify a set of correctable format errors in the format of each message, and is configured to correct each message that exhibits one or more of the correctable format errors; and
the external message broker is configured to authenticate each message received from the external side of the firewall to be from an authorized source.

23. The combination message broker system of claim 21, wherein the syntax rules are based on the nature of each message.

24. The combination message broker system of claim 19, wherein the internal message broker further includes a validation module configured to validate the syntax of one or more data of each received message using a set of syntax rules.

25. The combination message broker system of claim 24, wherein the validation module is configured to identify a set of correctable format errors in the format of each message, and is configured to correct each message that exhibits one or more of the correctable format errors.

26. A method for linking, across a firewall defining an internal side and an external side, a plurality of service engines including a plurality of internal service engines being located on the internal side of the firewall and a plurality of external service engines being located on the external side of the firewall, comprising:
connecting the plurality of internal service engines to an internal message broker on the internal side of the firewall via a communications link;
connecting the plurality of external service engines to an external message broker on the external side of the firewall via a communications link; and
connecting the internal message broker to the external message broker via a communications link placing the internal message broker and the external message broker in communication through the firewall;
wherein the internal message broker includes one or more modules, including:
a reception module configured to receive messages from the plurality of internal service engines in a plurality of connection technologies,
a mapping module configured to map each received message to a format meeting an internal-broker data standard,
a data extraction module configured for determining each destination to which each message should be routed, and configured to map each message to a format meeting standards of its determined destination for each such determined destination, and
a data transfer module configured to send messages to each determined destination using a connection technologies appropriate to each destination.

27. The method of claim 26, wherein the external message broker includes one or more modules, including:
a reception module configured to receive messages from the plurality of external service engines in a plurality of connection technologies;
a mapping module configured to map each received message to a format meeting an external-broker data standard;
a data extraction module configured for determining each destination to which each message should be routed, and configured to map each message to a format meeting standards of its determined destination for each such determined destination; and
a data transfer module configured to send messages to each determined destination using connection technologies appropriate to each destination.

28. The method of claim 27, wherein the internal data standard is the same as the external data standard.

* * * * *

UNITED STATES PATENT AND TRADEMARK OFFICE
CERTIFICATE OF CORRECTION

PATENT NO. : 7,237,037 B2 Page 1 of 1
APPLICATION NO. : 09/969369
DATED : June 26, 2007
INVENTOR(S) : David J. Wells et al.

It is certified that error appears in the above-identified patent and that said Letters Patent is hereby corrected as shown below:

In column 17, line 30, in Claim 10, delete "communication's" and insert -- communications --, therefor.

Signed and Sealed this

Nineteenth Day of May, 2009

JOHN DOLL
*Acting Director of the United States Patent and Trademark Office*